J. K. BOND.
FENDER FOR AUTOMOBILES.
APPLICATION FILED MAR. 11, 1911.
1,136,998.
Patented Apr. 27, 1915.
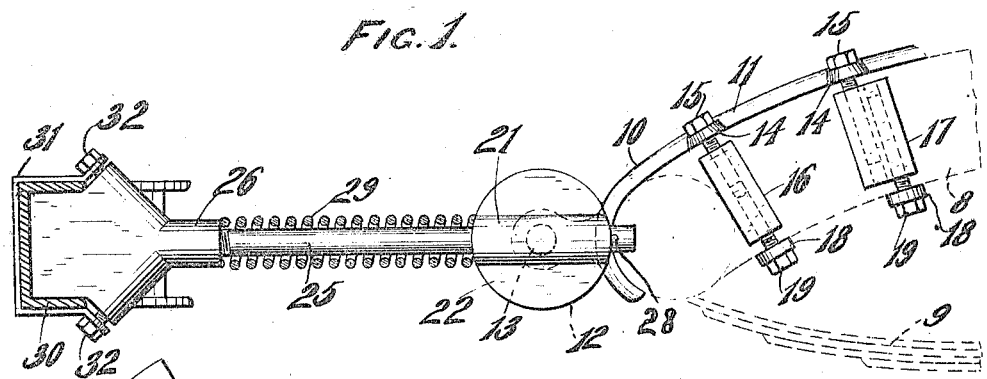
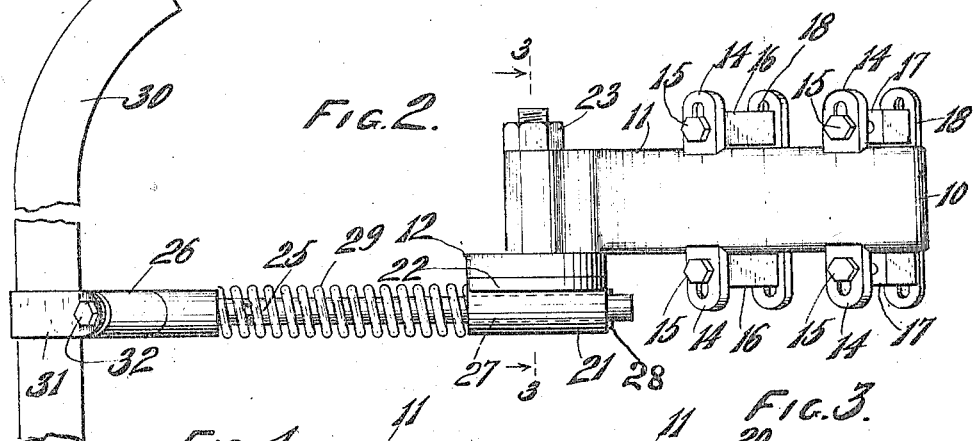
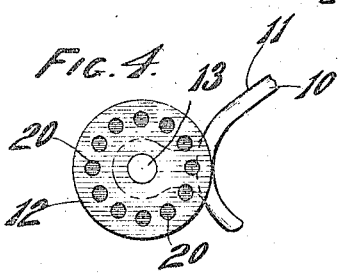
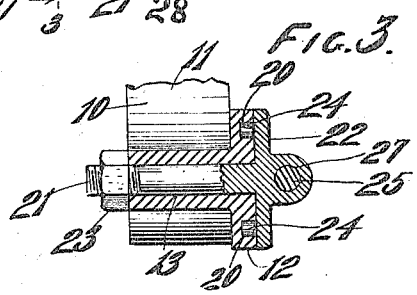
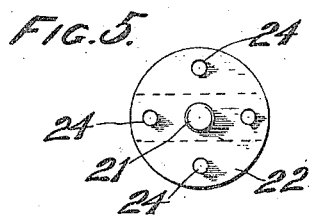
WITNESSES.
INVENTOR.
Jayson K. Bond.
By Morsell & Caldwell.
ATTORNEYS.

UNITED STATES PATENT OFFICE.

JAYSON K. BOND, OF MILWAUKEE, WISCONSIN, ASSIGNOR OF ONE-HALF TO KENNETH W. JACOBS, OF MILWAUKEE, WISCONSIN.

FENDER FOR AUTOMOBILES.

1,136,998.        Specification of Letters Patent.        Patented Apr. 27, 1915.

Application filed March 11, 1911. Serial No. 613,886.

*To all whom it may concern:*

Be it known that I, JAYSON K. BOND, a citizen of the United States, residing in Milwaukee, in the county of Milwaukee and State of Wisconsin, have invented new and useful Improvements in Fenders for Automobiles, of which the following is a description, reference being had to the accompanying drawings, which are a part of this specification.

This invention relates to improvements in fenders for automobiles and more particularly to that type adapted to be connected to automobile frames of different kinds and shapes.

It is one of the objects of this invention to provide a fender for automobile frames which may be easily connected to any automobile frame without the necessity of marring the frame in any manner and when so connected the fender may be adjusted to a horizontal position.

A further object of the invention is to provide a fender for automobiles which is adapted to be connected to a frame having either a full or a half elliptical spring frame.

A further object of the invention is to provide a fender for automobiles which is very simple in construction and is efficient in operation and which may be manufactured at minimum cost.

With the above, and other objects in view, the invention consists of the automobile fender and its parts and combinations as set forth in the claims, and all equivalents thereof.

In the accompanying drawing in which the same reference characters indicate the same parts in all of the views: Figure 1 is a vertical sectional view of one portion of the improved automobile fender shown connected to an automobile frame, said frame being shown by dotted lines; Fig. 2 is a plan view of one of the side attaching members of the fender and a portion of the buffer bar. Fig. 3 is a sectional detail view of the attaching member; Fig. 4 is a face view of the disk portion of the attaching member; Fig. 5 is a face view of the enlarged head of the eyed guide bolt.

For convenience of illustration the drawing shows only one half of the fender, but it is to be understood that the specification and claims are intended to and do describe the complete structure which consists of two attaching members connected together by a guard or buffer.

Referring to the drawing the numeral 8 indicates a portion of the frame and 9 a portion of the half elliptical spring of an automobile which is provided with the improved fender. The fender is constructed to be connected to the front portions of the frame on each side of the automobile and is provided with attaching means 10 (only one being shown) for that purpose.

Each attaching means is formed of a curved connecting member 11 shaped to conform to the upper front end of an automobile frame and is provided with laterally projecting disk shaped enlargement 12 having a central opening 13 which extends transversely through the forward end of the connecting member. The connecting member is also provided with laterally projecting slotted ears 14 through which extend bolts 15. These bolts are threaded into the upper ends of threaded side members 16 and 17 which are positioned in pairs on opposite sides of the frame. Slotted clip plates 18 extend transversely beneath the frame and bolts 19 passing through the slots are threaded into the lower ends of the side members 16 and 17 to adjustably connect the parts together. The slots of the connecting member provide for connecting the said member to frames of different widths.

The front face of the disk 12 is provided with a number of recesses 20 spaced an equal distance apart and positioned in a circumferential line concentric with relation to the central opening 13.

An eyed guide bolt 21 having an enlarged head 22 formed thereon extends through the central transverse openings 13 and has a nut 23 threaded on its end to hold the bolt in position. The enlarged head is provided with four projecting pins 24 positioned to enter the recesses 20 to prevent the rotation of said bolt 21 when in an adjusted position. A plunger rod 25 having a clamping head 26 threaded on its outer end extends through the eye 27 of the eyed bolt 21 and is provided with a pin 28 extending transversely therethrough to prevent its entire withdrawal from the eyed bolt. A coiled spring 29 surrounding the plunger rod and interposed between the eyed bolt 21 and the clamping head 26 serves to yieldingly hold the rod in its forward position. The clamping head extends into the channel of a channel iron buffer bar 30 and a strap 31 passing around the bar overlaps the clamping head and is fastened thereto by the bolts 32, thus tightly and adjustably clamping the bar between the strap and the head. This bar extends from one connecting member to the other and is yieldingly held in advance of the automobile to absorb and cushion the blow.

From the foregoing description it will be seen that the fender is very simple in construction and is adapted to be easily connected to automobile frames of various kinds and sizes.

What I claim as my invention is:

1. A fender for automobiles, comprising connecting members adapted to be rigidly connected to an automobile frame and provided with forward enlargements having recesses, eyed members revolubly connected to the enlargements and provided with pins positioned to enter the recesses and lock the members in adjusted positions, said revoluble members adapted to be adjusted with relation to the connecting members without changing the adjustment of the connecting members on the frame, plunger rods slidably extending through the eyes of the eyed members, a buffer carried by the outer ends of the rods, and springs surrounding the rods and interposed between the buffer and the eyed members.

2. A fender for automobiles, comprising connecting members adapted to be rigidly connected to an automobile frame and provided with disk shaped forward projections, eyed members revolubly connected to the disk shaped projections, the projections of the connecting members and the eyed members being provided with a pin and recess means for locking the members in adjusted positions, said revoluble members adapted to be adjusted with relation to the connecting members without changing the adjustment of the connecting members on the frame, plunger rods slidably extending through the eyes of the eyed members, clamping heads carried by the outer ends of the rods, coiled springs surrounding the rods and interposed between the eyed members and the clamping heads, and a buffer connected to the clamping heads.

3. A fender for automobiles, comprising connecting members adapted to be rigidly connected to an automobile frame and provided with disk-shaped forward projections having medial openings and a circumferential line of recesses, eyed bolts extending through the medial openings and provided with enlarged heads having projecting pins positioned to enter the recesses of the disk shape projections to lock said parts in adjusted positions, said revoluble members adapted to be adjusted with relation to the connecting members without changing the adjustment of the connecting members on the frame, plunger rods slidably extending through the eyes of the eyed bolts, clamping heads carried by the outer ends of the rods, coiled springs surrounding the rods and interposed between the eyed bolts and the clamping heads, and a buffer connected to the clamping heads.

4. A fender for automobiles, comprising connecting members each provided with slotted laterally projecting ears and with a disk-shaped forward projection having a medial opening and a circumferential line of recesses, threaded side members engaged by bolts passing through the projecting ears, clip plates extending transversely beneath the side members and through which bolts extend and are threaded into the side members, eyed bolts extending through the medial openings and provided with enlarged heads having projecting pins positioned to enter the recesses of the disk shape projections to lock said parts in adjusted positions, plunger rods slidably extending through the eyes of the eyed bolts, clamping heads carried by the outer ends of the rods, coiled springs surrounding the rods and interposed between the eyed bolts and the clamping heads, and a buffer connected to the clamping heads.

In testimony whereof, I affix my signature, in presence of two witnesses.

JAYSON K. BOND.

Witnesses:
C. H. KEENEY,
KATHERINE HOLT